(12) United States Patent
Lee

(10) Patent No.: US 7,400,315 B2
(45) Date of Patent: Jul. 15, 2008

(54) POWER CONTROL SYSTEM FOR LCD MONITOR

(75) Inventor: Sang Ho Lee, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 580 days.

(21) Appl. No.: 10/706,292

(22) Filed: Nov. 13, 2003

(65) Prior Publication Data

US 2004/0164979 A1 Aug. 26, 2004

(30) Foreign Application Priority Data

Feb. 21, 2003 (KR) .................. 10-2003-0011049

(51) Int. Cl.
*G09G 3/36* (2006.01)
*G09G 5/00* (2006.01)
*G06F 3/038* (2006.01)

(52) U.S. Cl. .................. 345/102; 345/211

(58) Field of Classification Search ............... 345/87, 345/102, 211–213; 315/291
See application file for complete search history.

(56) References Cited

U.S. PATENT DOCUMENTS

| 5,151,631 | A | * | 9/1992 | Oda et al. ............ 315/127 |
| 5,659,460 | A | | 8/1997 | Vinciarelli ............ 363/21 |
| 5,854,617 | A | * | 12/1998 | Lee et al. ............ 345/102 |
| 6,111,732 | A | | 8/2000 | Beland ............ 361/42 |
| 6,151,232 | A | * | 11/2000 | Furuhashi et al. ............ 363/97 |
| 6,498,437 | B1 | | 12/2002 | Chang et al. ............ 315/141 |

FOREIGN PATENT DOCUMENTS

| EP | 2002-341775 | 11/2002 |
| EP | 1385360 | 1/2004 |

OTHER PUBLICATIONS

European Office Action dated Jul. 11, 2006.

* cited by examiner

*Primary Examiner*—Bipin Shalwala
*Assistant Examiner*—Steven E Holton
(74) *Attorney, Agent, or Firm*—Ked & Associates, LLP

(57) ABSTRACT

A power control system for an LCD monitor having an LCD panel includes a light source unit providing light to the LCD panel, a power supply unit generating a standard low DC current, and a high-voltage generator for converting the lower DC voltage to a relatively high voltage and supplying the high voltage to the light source. The power control system further includes a feedback control unit coupled to the power supply unit for interrupting the operation of the power supply unit when the converted high voltage is determined to be abnormal. The feedback control unit includes a cable, through which a voltage can be induced due to high voltage generated by the high-voltage generator, and a power supply control circuit capable of interrupting the operation of the power supply unit when the converted high voltage is determined to be abnormal by analyzing the induced current.

21 Claims, 2 Drawing Sheets

POWER CONTROL SYSTEM FOR LCD MONITOR

CROSS-REFERENCE TO RELATED APPLICATIONS

This application claims the benefit of Korean Application No. P2003-11049, filed on Feb. 21, 2003, which is hereby incorporated by reference as if fully set forth herein.

BACKGROUND OF THE INVENTION

1. Field of the Invention

The present invention relates to an LCD monitor, and more particularly, to a power control system for an LCD monitor.

2. Discussion of the Related Art

In general, a liquid crystal display (LCD) panel included in an LCD monitor displays an image by injecting a liquid crystal into a space between two thin glass plates and varying the voltage of electrodes of the glass plates. The LCD panel does not generate any light by itself. Therefore, it requires a light source in order to enable a user to view an image being displayed on the LCD panel. For the reason set above, a typical LCD monitor includes an LCD panel, a lamp unit providing light to the LCD panel, an LCD inverter and power supply (LIPS) unit supplying the required power to the lamp unit, and a controller controlling the LIPS system. The LIPS unit often employs a control circuit for protecting the lamp unit from being damaged due to a power surge (voltage or current) within the lamp unit.

The control circuit directly senses the voltage (usually higher than 600V) and current being supplied to the lamp unit. When the control circuit detects a voltage surge (or current surge) within the lamp unit, it reduces or cuts off the electric power being supplied to the lamp unit for protecting the lamp unit by sending corresponding control signals. However, the control circuit described above has several problems. First, the control circuit is designed to protect the lamp unit, but not the LIPS system. A voltage surge may occur within the LIPS system that still supplies a normal voltage to the lamp unit. In this case, the control circuit will not be able to detect such voltage surge within the LIPS system. In other words, the control circuit is incapable of preventing the LIPS system from being damaged when any one of the components of the LIPS system does not operate properly. The malfunctioning components and any other unit coupled to such components will be greatly damaged.

Next, if one or more components of the LIPS system do not operate, they may not be properly controlled by the control circuit. Therefore, even when the control circuit detects a power surge of the lamp unit, the LIPS system may not properly reduce or cut off the power to protect the lamp unit as indicated in the control signals, causing the lamp unit to be even more damaged. In addition, the above control circuit directly senses the voltage being supplied to the lamp unit. When an abnormally high voltage (voltage surge) is feedback to the control circuit, the circuit may be damaged. Therefore, a power supply control system that is able to protect the lamp unit as well as a power supply is desired.

SUMMARY OF THE INVENTION

Accordingly, the present invention is directed to a power control system for an LCD monitor that substantially obviates one or more problems due to limitations and disadvantages of the related art.

An object of the present invention is to provide a power control system for an LCD monitor, which is able to protect not only a lamp unit of the LCD monitor but also a power supply supplying power to the lamp unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power control system for an LCD monitor having an LCD panel according to the present invention may include a light source unit providing light to the LCD panel, a power supply unit generating a standard low DC voltage, and a high-voltage generator coupled to the power supply unit for converting the DC voltage to a relatively high voltage. The high voltage generator supplies the high voltage to the light source unit. The power control system may further include a feedback control unit coupled to the power supply for interrupting the operation of the power supply unit when the converted high voltage is determined to be abnormal.

The feedback control unit may include a printed circuit board (PCB) pattern, through which a voltage can be induced due to the high voltage generated by the high-voltage generator, and a power supply control circuit coupled to the PCB pattern and the power supply unit. The power supply control circuit may be integrated within the power supply unit. The control circuit analyzes the induced voltage in order to determine whether the converted high voltage is abnormal or not. For example, the high voltage may be determined to be abnormal when the induced voltage is suddenly increased or decreased or when there is no voltage induced through the PCB pattern at all. In addition, the high voltage may be determined to be abnormal when the induced voltage is less than a predetermined voltage level. Once the high voltage is determined to be abnormal, the control circuit interrupts the operation of the power supply unit, which discontinues supplying power to the high-high voltage generator for protection.

The power supply control circuit described above may include a first capacitor coupled to the PCB pattern for performing AC coupling on the induced voltage, an integration circuit coupled to the first capacitor for converting the AC-coupled voltage to a DC voltage by integration, and a first diode coupled to the integration circuit and the power supply control circuit for outputting the integrated DC voltage to the power supply unit. The control circuit may further include a zener diode coupled to the first diode for cutting off the DC voltage being outputted through the first diode when it is higher than a breakdown voltage of the zener diode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
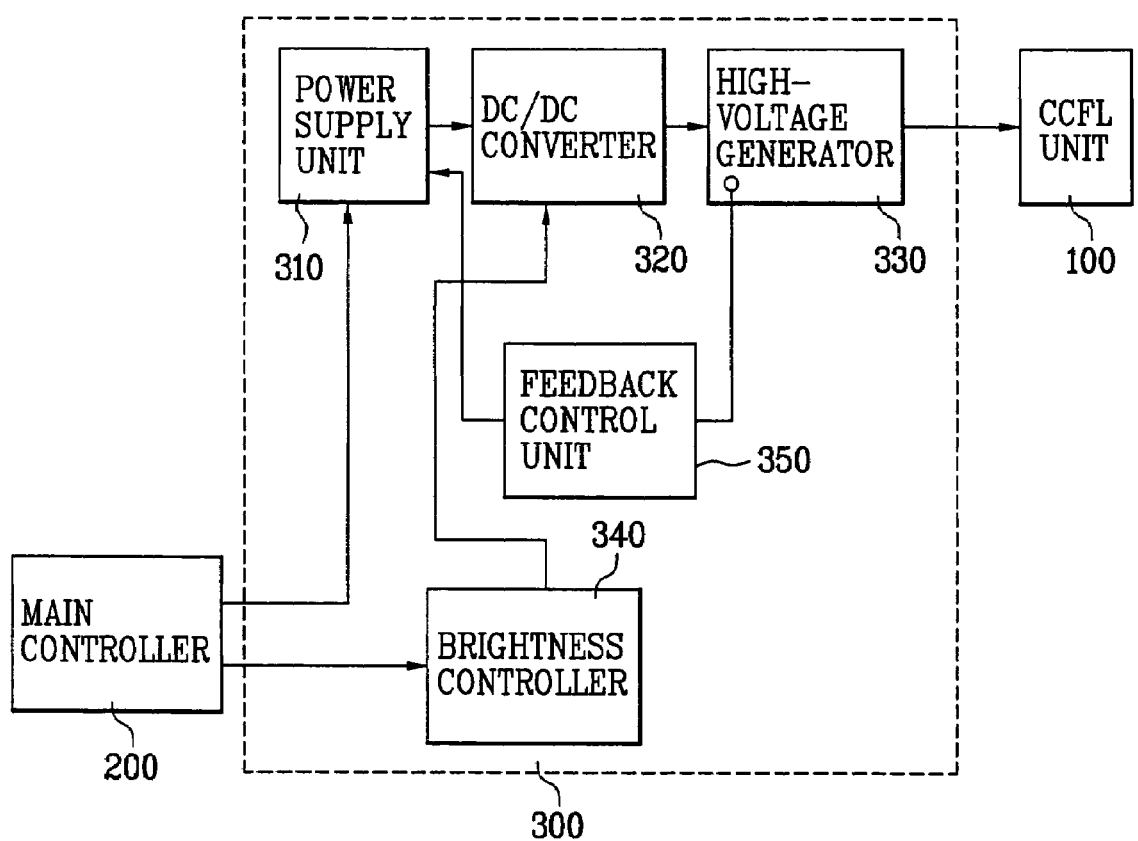
FIG. 1 illustrates a power control system using a feedback control for an LCD monitor according to the present invention.

FIG. 1 illustrates a power control system using a feedback control for a liquid crystal display (LCD) monitor according to the present invention. The power control system shown in FIG. 1 includes a cold cathode fluoresce lamp (CCFL) unit 100 providing light to an LCD panel (not illustrated) of the LCD monitor, an LCD inverter and power supply (LIPS) system 300 supplying the required electric power to the CCFL unit 100, and a main controller 200. The main controller 200 generates a power control signal to the LIPS system 300 for turning the system's power on/off, and it further generates a brightness control signal to the LIPS system 300 for controlling the brightness of the CCFL unit 100.

The LIPS system 300 shown in FIG. 1 includes a power supply unit 310 that generates a standard DC voltage upon receiving a power-on signal from the main controller 200, a direct current to direct current (DC/DC) converter 320 that converts the standard DC voltage to a predetermined DC voltage, a high-voltage generator 330 that converts the predetermined DC voltage to a relatively high voltage required for operating the CCFL unit 100. The LIPS system 300 further includes a brightness controller 340 that controls the output voltage level of the DC/DC converter 320 according to a CCFL brightness control signal received from the main controller 200, and a feedback control unit 350 that detects a power surge (abnormal voltage) of the high voltage generator 330 or CCFL unit 100 by analyzing a voltage induced due to the voltage being generated by the high voltage generator 330. The control unit 350 controls the power supply unit 310 according to the power surge determination.

Figure 2:
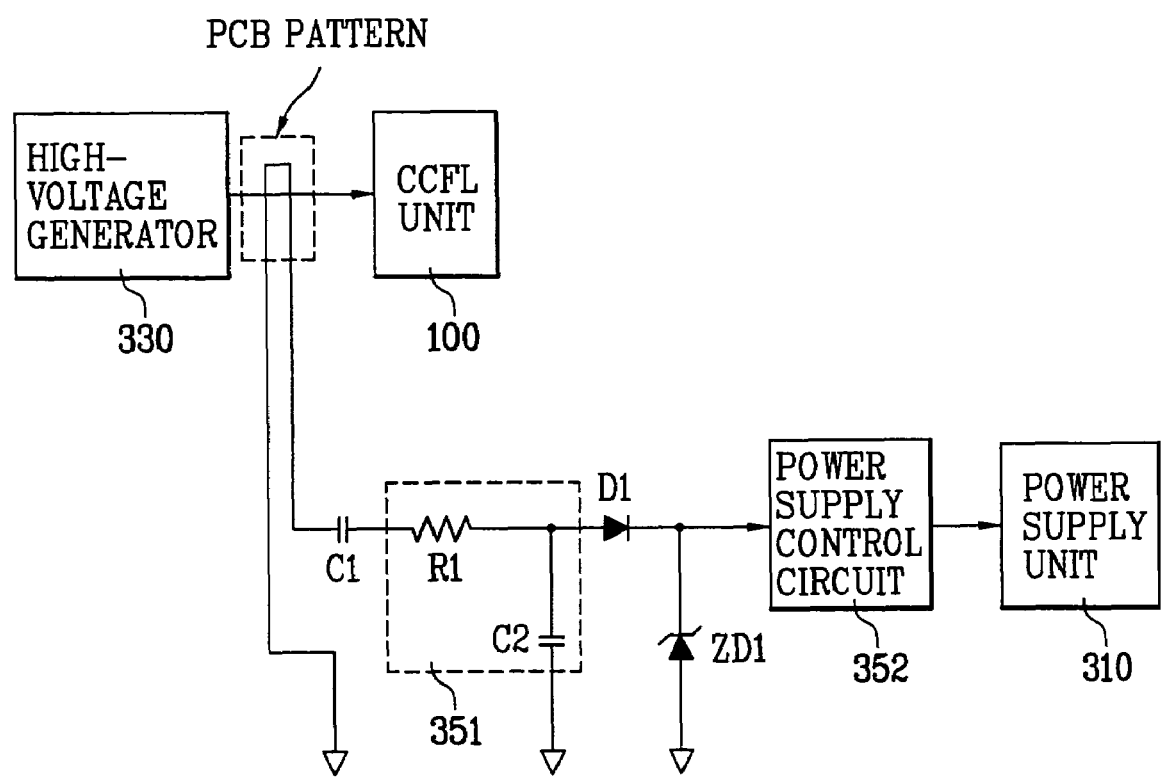
FIG. 2 illustrates the feedback control system 350 shown in FIG. 1 in detail.

FIG. 2 illustrates the feedback control unit 350 shown in FIG. 1 in detail. According to FIG. 2, the feedback control unit 350 includes a printed circuit board (PCB) pattern or patterned conductor provided close (not directly coupled) to the high voltage generator 330 or CCFL unit 100. When the high voltage generator 330 outputs a high voltage to the CCFL unit 100, a corresponding voltage is induced through the PCB pattern. Since the induced voltage is less than the high voltage, the control circuit may not be damaged even when the high voltage generated by the high-voltage generator 330 is extremely high. The feedback control unit 350 further includes a first capacitor C1 which performs alternating current (AC) coupling on the induced voltage generated through the PCB pattern, and an integration circuit 351 for converting the AC-coupled voltage to a DC voltage by integrating the AC-coupled voltage. The integration circuit 351 may include a resistor R1 and a second capacitor C2 as shown in FIG. 2. In addition, the feedback control unit 350 may further include a diode D1 outputting the converted DC voltage, and a zener diode ZD1 which cuts off the DC voltage being outputted from the diode D1 if it is higher than the breakdown voltage (or zener voltage) of the zener diode ZD1.

Furthermore, the feedback control unit 350 may include a power supply control circuit 352 that determines an abnormality of the voltage (e.g., voltage surge) generated by the high voltage generator 330 by analyzing the induced DC voltage outputted from the diode D1. If the power supply control circuit 352 determines such abnormality, it interrupts the operation of the power supply unit 310 shown in FIG. 1 and cuts off the power being supplied to the DC/DC converter 320. The power supply control circuit 352 may be provided external to the power supply unit 310 as shown in FIG. 2, or alternatively, it may be integrated within the power supply unit 310. In the latter case, the power supply control circuit 352 may be a switching mode power supply (SMPS) control circuit Reference will now be made in detail to the operation of the power control system shown in FIG. 1 and FIG. 2. When the power supply unit 310 connected to an external power source (not illustrated) receives a power control signal from the main controller 200 for turning the power on, it converts the AC input voltage (e.g., AC 100 or 220 voltage) supplied by the external power source to a standard low DC voltage necessary for operating the LCD monitor. The DC/DC converter 320 coupled to the power supply unit 310 then converts the standard DC voltage into the required half sine wave DC voltage and current. Next, the high voltage generator 330 converts the half sine wave DC voltage to a relatively high voltage (e.g., 600 V or higher) and outputs the high voltage to the CCFL unit 100. In addition, the main controller 200 outputs a brightness control signal to the brightness controller 340, which controls the output DC voltage level of the DC/DC converter 320 according to the brightness control signal received.

When a voltage is induced through the PCB pattern of the feedback control unit 350 shown in FIG. 2, the induced voltage is feedback to the power supply control circuit 352. Then the control circuit 352 determines whether the voltage being generated by the high voltage generator 330 or being supplied to the CCFL unit 100 is abnormal (e.g., sudden voltage drop/rise or no voltage at all) by receiving and analyzing the induced voltage (feedback voltage). For example, the high voltage generated by the high-voltage generator 330 may be determined to be abnormal when the voltage induced through the PCB pattern is suddenly increased or decreased or when there is no voltage induced through the PCB pattern at all. Alternately, it may be determined to be abnormal when the induced voltage is less than a predetermined voltage level which may be previously set in the power supply control circuit 352.

The abnormality of the high voltage generator 330's output voltage may occur when the CCFL unit 100 is in an open state or when any one of the power supply unit 310, DC/DC converter 320, and high voltage generator 330 does not function properly or is damaged. When the power supply control circuit 352 detects such abnormal voltage, it protects the LIPS system 300 and the CCFL unit 100 by interrupting the operation of the power supply unit 310 and cutting off the power being supplied to the DC/DC converter 320. The power supply control circuit 352 may be provided outside (external) the power supply unit 310 and be coupled to the power supply unit 310 as shown in FIG. 2, or it may be provided within the power supply unit 310. In the latter case, the power supply control circuit 352 may be a switching mode power supply (SMPS) control circuit of the power supply unit 310, which will determine an abnormality of the high voltage and will cut off the power being supplied by the power supply unit 310.

In other words, when a voltage is induced through the PCB pattern shown in FIG. 2 due to the high voltage being generated by the high voltage generator 330, then first capacitor C1 electrically connected to the PCB pattern performs AC coupling on the induced voltage. Next, the integration circuit (R1 and C2) converts the AC-coupled induced voltage to a DC voltage, which passes through the diode D1 and is outputted to the power supply control circuit 352. The control circuit 352 interrupts the operation of the power supply unit 310 if the high voltage generated by the high voltage generator 330 is determined to be abnormal. In addition, the zener diode coupled to the diode D1 and the power supply unit 310 allows the output voltage of the diode D1 to be inputted to the power supply unit 310 if it is less than a breakdown voltage (zener voltage). However, it cuts off the DC voltage being inputted to the power supply unit 310 if it is higher than the breakdown voltage.

As described above in detail, the power supply control system according to the present invention allows to interrupt the operation of the LIPS system 300 and to cut off the power being supplied by the power supply unit 310 when the CCFL unit 100 is in an open state or when any one of the power supply unit 310, DC/DC converter 320, and high voltage generator 330 does not function properly or is damaged. In this way, further damages to any other components of the LIPS system 300 can be greatly reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A power control system for a liquid crystal display (LCD) monitor having an LCD panel, the power control system comprising:
   a light source unit for providing light to the LCD panel;
   a power supply unit for generating a low direct current (DC) voltage;
   a high-voltage generator for outputting to the light source unit a high voltage based on the low DC voltage; and
   a feedback control unit for detecting a voltage induced from the high voltage output, for determining based on a level of the induced voltage an abnormal condition of the high voltage output, and for inhibiting the output of the high-voltage generator during a time corresponding to the abnormal condition by suspending operation of said power supply unit during the time corresponding to the abnormal condition,
   wherein said feedback control unit comprises a patterned conductor for conducting the induced voltage to said feedback control unit,
   wherein the patterned conductor is configured to transmit the conductor voltage, the transmitted voltage representing the abnormal condition if a power surge exists in the high voltage output, representing the abnormal condition if there is no detection of induced voltage from voltage output, representing the abnormal condition if the level of the induced voltage indicates that the high voltage is less than a predetermined voltage level.

2. The power control system of claim 1, wherein the patterned conductor is a printed current board (PCB) pattern disposed electromagnetically proximate to an electric output of the high-voltage generator and to an electric input of the light source unit.

3. The power control system of claim 1, wherein the feedback control unit comprises:

a power supply control circuit for receiving the induced voltage and for suspending the operation of the power supply unit during the time corresponding to the abnormal condition.

4. The power control system of claim 3, wherein the power supply control circuit is integrated within the power supply unit.

5. The power control system of claim 3, wherein the feedback control unit further comprises:
   a Zener diode for limiting the induced voltage received by the power supply control circuit.

6. The power control system of claim 4, wherein the power supply control circuit is a switching mode power supply (SMPS) control circuit.

7. The power control system of claim 1, wherein the feedback control unit comprises:
   a coupling capacitor for alternating current (AC) coupling the induced voltage conducted by the patterned conductor;
   an integration circuit for integrating the AC-coupled voltage, to output an integrated DC voltage; and
   a rectifying diode for outputting the integrated DC voltage, the integrated DC voltage being used to determine the abnormal condition.

8. The power control system of claim 7, wherein the integration circuit comprises a series resistor and a shunt capacitor.

9. The power control system of claim 1, wherein the light source unit is a fluorescent lamp.

10. The power control system of claim 9, wherein the fluorescent lamp is a cold cathode fluorescent lamp (CCFL).

11. The power control system of claim 1, wherein the patterned conductor is electrically isolated from the high voltage output and has two ends, one end being connected to an input of the feedback control unit and the other end being grounded.

12. A power control system for a liquid crystal display (LCD) monitor having an LCD panel, the power control system comprising:
   a light source unit for providing light to the LCD panel;
   a power supply unit for generating a standard DC voltage;
   a direct current to direct current (DC/DC) converter for converting the standard DC voltage to a predetermined DC voltage;
   a high-voltage generator for outputting to the light source unit a high voltage based on the predetermined DC voltage; and
   a feedback control unit for detecting a voltage induced from the high voltage output, for determining based on a level of the induced voltage an abnormal condition of the high voltage output, and for inhibiting the output of the high-voltage generator during a time corresponding to the abnormal condition by suspending operation of said power supply unit during the time corresponding to the abnormal condition,
   wherein said feedback control unit comprises a printed current board (PCB) pattern disposed electromagnetically proximate to an electrical output of the high-voltage generator and to an electrical input of the light source unit, for conducting the induced voltage to said feedback control unit,
   wherein the PCB pattern is configured to transmit the conductor voltage, the transmitted voltage representing the abnormal condition if a power surge exists in the high voltage output, representing the abnormal condition if there is no detection of induced voltage from the high voltage output, and representing the abnormal condition if the level of the induced voltage indicates that the high voltage is less than a predetermined voltage level.

13. The power control system of claim 12, wherein the feedback control unit further comprises:
   a power supply control circuit for receiving the induced voltage and for suspending the operation of the power supply unit during the time corresponding to the abnormal condition.

14. The power control system of claim 13, wherein the power supply control circuit is integrated within the power supply unit.

15. The power control system of claim 14, wherein the power supply control circuit is a switching mode power supply (SMPS) control circuit.

16. The power control system of claim 13, wherein the feedback control unit further comprises:
   a coupling capacitor alternating current (AC) coupling the induced voltage conducted by the PCB pattern;
   an integration circuit for integrating the AC-coupled voltage, to output an integrated DC voltage; and
   a rectifying diode for outputting the integrated DC voltage to the power supply control circuit,
   wherein the power supply control circuit uses the integrated DC voltage to determine the abnormal condition.

17. The power control system of claim 16, wherein the integration circuit comprises a series resistor and a shunt capacitor.

18. The power control system of claim 13, wherein the feedback control unit further comprises:
   a Zener diode for limiting the induced voltage received by the power supply control circuit.

19. The power control system of claim 12, further comprising:
   a main controller for generating a power control signal for controlling an on/off function of the power supply unit and for generating a brightness control signal for controlling brightness of the light source unit.

20. The power control system of claim 19, further comprising:
   a brightness controller for controlling the predetermined DC voltage output from the DC/DC converter according to the brightness control signal received from the main controller.

21. A method for controlling power to a liquid crystal display (LCD) monitor having an LCD panel, the method comprising:
   generating a low direct current (DC) voltage;
   generating a high voltage based on the low DC voltage;
   applying the generated high voltage to a light source unit for providing light to the LCD panel;
   detecting a voltage induced from the high voltage applied to the light source unit;
   determining, based on a level of the induced voltage, an abnormal condition of the high voltage output; and
   inhibiting said high-voltage generation during a time corresponding to the abnormal condition by suspending said low DC voltage generating,
   wherein the detected voltage is induced into a patterned conductor for conducting the induced voltage to a feedback control unit and wherein the patterned conductor is configured to transmit the conducted voltage, the transmitted voltage representing the abnormal condition if a power surge exists in the high voltage output, and representing the abnormal condition if the induced voltage indicates that the high voltage is less than a predetermined voltage level.

* * * * *